United States Patent
Forouzandehmehr et al.

(10) Patent No.: US 12,450,644 B2
(45) Date of Patent: Oct. 21, 2025

(54) SYSTEMS AND METHODS FOR RECOMMENDING MIXED-INTENT BASKET COMPLEMENTARY ITEMS

(71) Applicant: Walmart Apollo, LLC, Bentonville, AR (US)

(72) Inventors: Najmeh Forouzandehmehr, Saratoga, CA (US); Luyi Ma, San Jose, CA (US); Sinduja Subramaniam, San Jose, CA (US); Evren Korpeoglu, San Jose, CA (US); Kannan Achan, Saratoga, CA (US); Shubham Gupta, San Jose, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 334 days.

(21) Appl. No.: 18/100,681

(22) Filed: Jan. 24, 2023

(65) Prior Publication Data
US 2023/0245209 A1    Aug. 3, 2023

Related U.S. Application Data

(60) Provisional application No. 63/304,897, filed on Jan. 31, 2022.

(51) Int. Cl.
*G06Q 30/00* (2023.01)
*G06Q 30/0601* (2023.01)

(52) U.S. Cl.
CPC ..... *G06Q 30/0631* (2013.01); *G06Q 30/0633* (2013.01); *G06Q 30/0643* (2013.01)

(58) Field of Classification Search
CPC ........... G06Q 30/0601; G06Q 30/0613; G06Q 30/0623; G06Q 30/0629; G06Q 30/0631
See application file for complete search history.

(56) References Cited

U.S. PATENT DOCUMENTS

| 8,386,336 B1 * | 2/2013 | Fox ............... G06Q 30/0631 705/26.7 |
| 2001/0021914 A1 * | 9/2001 | Jacobi .............. G06Q 30/02 705/26.1 |

(Continued)

OTHER PUBLICATIONS

Felicioni, Nicolò, Maurizio Ferrari Dacrema, and Paolo Cremonesi. "Measuring the user satisfaction in a recommendation interface with multiple carousels." Proceedings of the 2021 ACM International Conference on Interactive Media Experiences. 2021. (Year: 2021).*

(Continued)

*Primary Examiner* — Christopher B Seibert
(74) *Attorney, Agent, or Firm* — Foley & Lardner LLP

(57) ABSTRACT

A system including one or more processors and one or more non-transitory computer-readable media storing computing instructions that, when executed on the one or more processors, cause the one or more processors to perform: mapping each item of multiple items in a mixed-intent basket to a respective product type code (PT code); generating a respective list of complementary product type codes from each respective PT code; generating, using a complementary item algorithm, a respective candidate set of complementary items; detecting a platform-level configuration of a platform used by an electronic device of a user; loading, using diversity rotation, the respective quantity of complementary items onto a website carousel; and displaying the website carousel, as loaded, on the electronic device of the user, wherein the website carousel is sized to fit the platform-level configuration. Other embodiments are disclosed.

20 Claims, 10 Drawing Sheets

(56) References Cited

U.S. PATENT DOCUMENTS

| | | | | |
|---|---|---|---|---|
| 2004/0054610 | A1* | 3/2004 | Amstutz | G06Q 40/06 |
| | | | | 705/36 R |
| 2005/0240319 | A1* | 10/2005 | Sawada | B60W 50/14 |
| | | | | 701/1 |
| 2006/0085450 | A1* | 4/2006 | Seubert | G06Q 30/04 |
| 2009/0110089 | A1* | 4/2009 | Green | H04L 5/0037 |
| | | | | 370/329 |
| 2010/0268661 | A1* | 10/2010 | Levy | G06Q 30/02 |
| | | | | 705/347 |
| 2012/0004769 | A1* | 1/2012 | Hallenbeck | G07F 11/62 |
| | | | | 700/232 |
| 2012/0278091 | A1* | 11/2012 | Yaseen | G06Q 30/02 |
| | | | | 705/1.1 |
| 2013/0123667 | A1* | 5/2013 | Komatireddy | A61B 5/746 |
| | | | | 600/595 |
| 2014/0013033 | A1* | 1/2014 | Sharon | G11C 11/5628 |
| | | | | 711/103 |
| 2015/0048170 | A1* | 2/2015 | Forster | G06K 19/0776 |
| | | | | 53/411 |
| 2015/0052003 | A1* | 2/2015 | Tang | G06Q 30/0631 |
| | | | | 705/26.7 |
| 2015/0294417 | A1* | 10/2015 | Toglia | G06Q 40/04 |
| | | | | 705/37 |
| 2017/0262737 | A1* | 9/2017 | Rabinovich | G06V 30/19173 |
| 2018/0243650 | A1* | 8/2018 | Baszucki | A63F 13/355 |
| 2019/0205905 | A1* | 7/2019 | Raghunathan | G06F 18/214 |
| 2019/0385213 | A1* | 12/2019 | Pande | G06Q 30/0224 |
| 2020/0118394 | A1* | 4/2020 | Chen | A63F 13/35 |
| 2020/0287397 | A1* | 9/2020 | Jiao | H02J 7/0045 |
| 2021/0050089 | A1* | 2/2021 | Mohammed | G06N 20/00 |
| 2021/0090154 | A1* | 3/2021 | Michaelson | G06Q 30/0643 |
| 2021/0241343 | A1* | 8/2021 | Arora | G06Q 30/0633 |
| 2021/0241344 | A1* | 8/2021 | Mantha | G06F 16/9035 |
| 2021/0366021 | A1* | 11/2021 | Deuskar | G06Q 30/0631 |
| 2021/0390455 | A1* | 12/2021 | Schierz | G06N 20/00 |
| 2022/0148062 | A1* | 5/2022 | Sinha | G06N 20/00 |
| 2022/0245703 | A1* | 8/2022 | Chaganti | G06Q 30/0623 |
| 2022/0245710 | A1* | 8/2022 | Maheshwari | G06Q 30/0631 |

OTHER PUBLICATIONS

Pfeiffer, Daniel. "Designing for Multiple Screens in iOS." Mastering Mobile Learning (2014): 229-234. (Year: 2014).*

Ma, L., et al., "Diversification of Complementary Item Recommendations with User Preference in Online Grocery," Association for Computing Machinery, https://doi.org/10.1145/1122445.1122456 2018.

Hao, J., et al., "P-Companion: A Principled Framework for Diversified Complementary Product Recommendation," CIKM'20, Oct. 19-23, 2020, Virtual Oct. 19, 2020.

Chen, A. and Chiu, A., "A Method and System for Automation of Product Bundling Service by Scalable Complementary Products Discovery," IP.Com Journal Dec. 5, 2014.

Liu, Z., et al., "Basket Recommendation with Multi-Intent Translation Graph Neural Network," IEEE, arXiv:2010.11419v1 [cs.IR] Oct. 22, 2020.

Rahdari, B., Brusilovsky, P., and Javadian Sabet, A., "Controlling Personalized Recommendations in Two Dimensions with a Carousel-Based Interface," IntRS'21: Joint Workshop on Interfaces and Human Decision Making for Recommender Systems, Virtual Event, CEUR-WS.org/vol-2948/short3.pdf Sep. 25, 2021.

* cited by examiner

FIG. 9

SYSTEMS AND METHODS FOR RECOMMENDING MIXED-INTENT BASKET COMPLEMENTARY ITEMS

CROSS-REFERENCE TO RELATED APPLICATIONS

This application is a non-provisional application that claims priority to U.S. Provisional Application No. 63/304,897, filed Jan. 31, 2022. U.S. Provisional Application No. 63/304,897 is incorporated herein by reference in its entirety.

TECHNICAL FIELD

This disclosure relates generally relates to recommending mixed-intent basket complementary items.

BACKGROUND

Generally, a user can log on to a website and view an unlimited number and variety of items to add to an online cart during a visit to (or session on) the website. Such an order can include a combination of groceries and general merchandise items added to the same online cart.

BRIEF DESCRIPTION OF THE DRAWINGS

To facilitate further description of the embodiments, the following drawings are provided in which:

FIG. 9 illustrates an exemplary display screen of a website carousel sized to fit a display screen of a website as viewed on a full computer screen of an electronic device, according to an embodiment.

Figure 1:
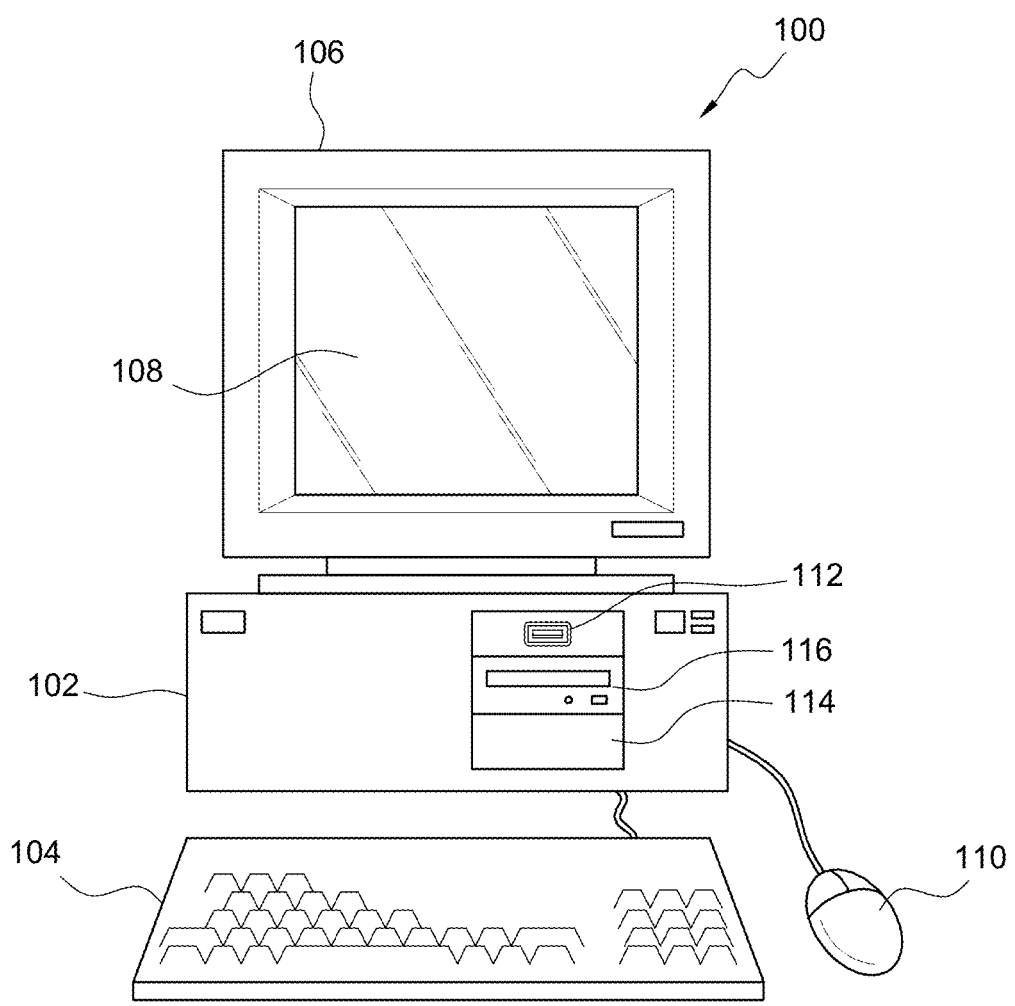
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In many embodiments, "approximately" can mean within plus or minus five percent of the stated value. In further embodiments, "approximately" can mean within plus or minus three percent of the stated value. In yet many embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, five seconds, ten seconds, thirty seconds, one minute, five minutes, ten minutes, one hour, six hours, twelve hours, or twenty-four hours.

DESCRIPTION OF EXAMPLES OF EMBODIMENTS

Figure 2:
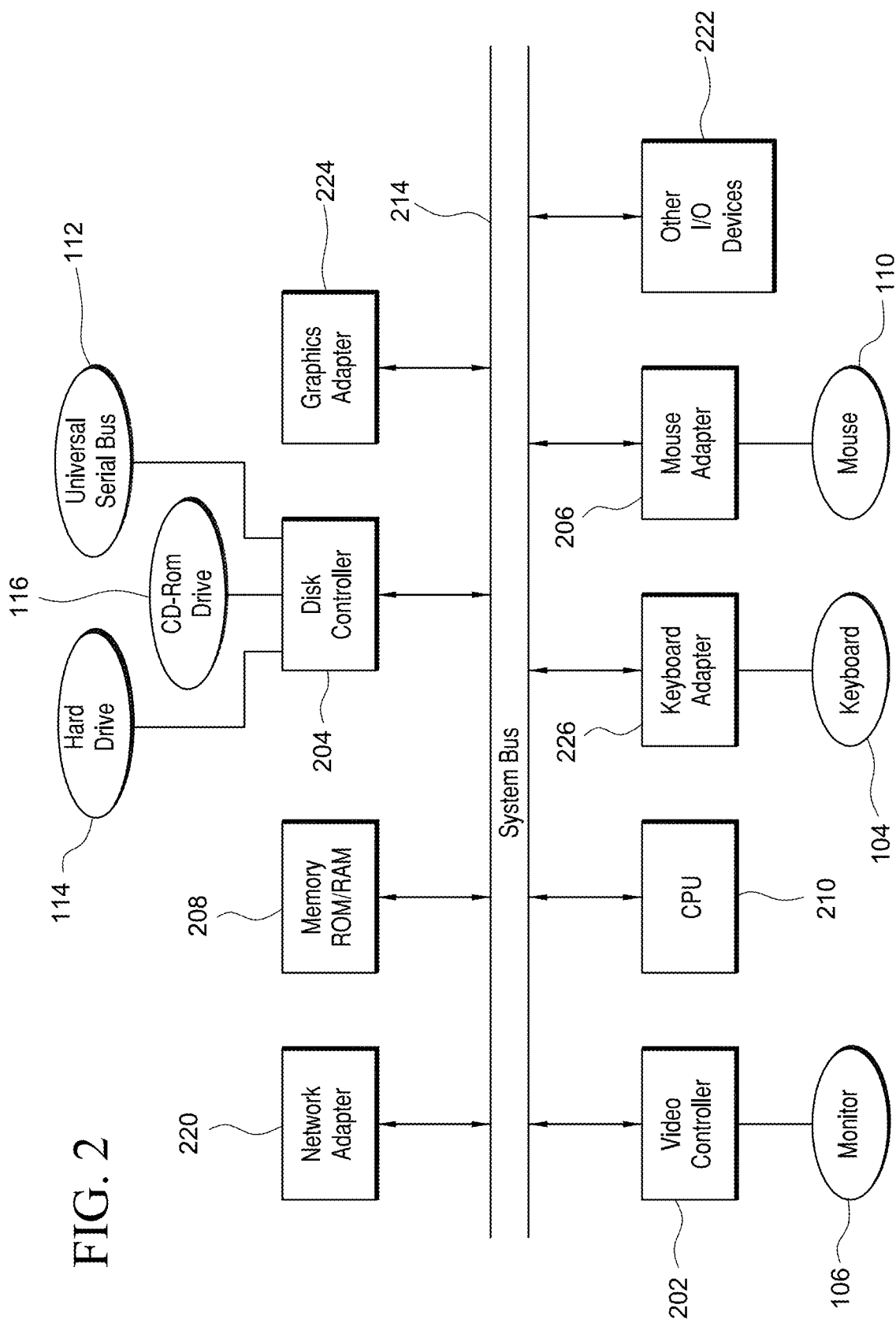
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can includes one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 100) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
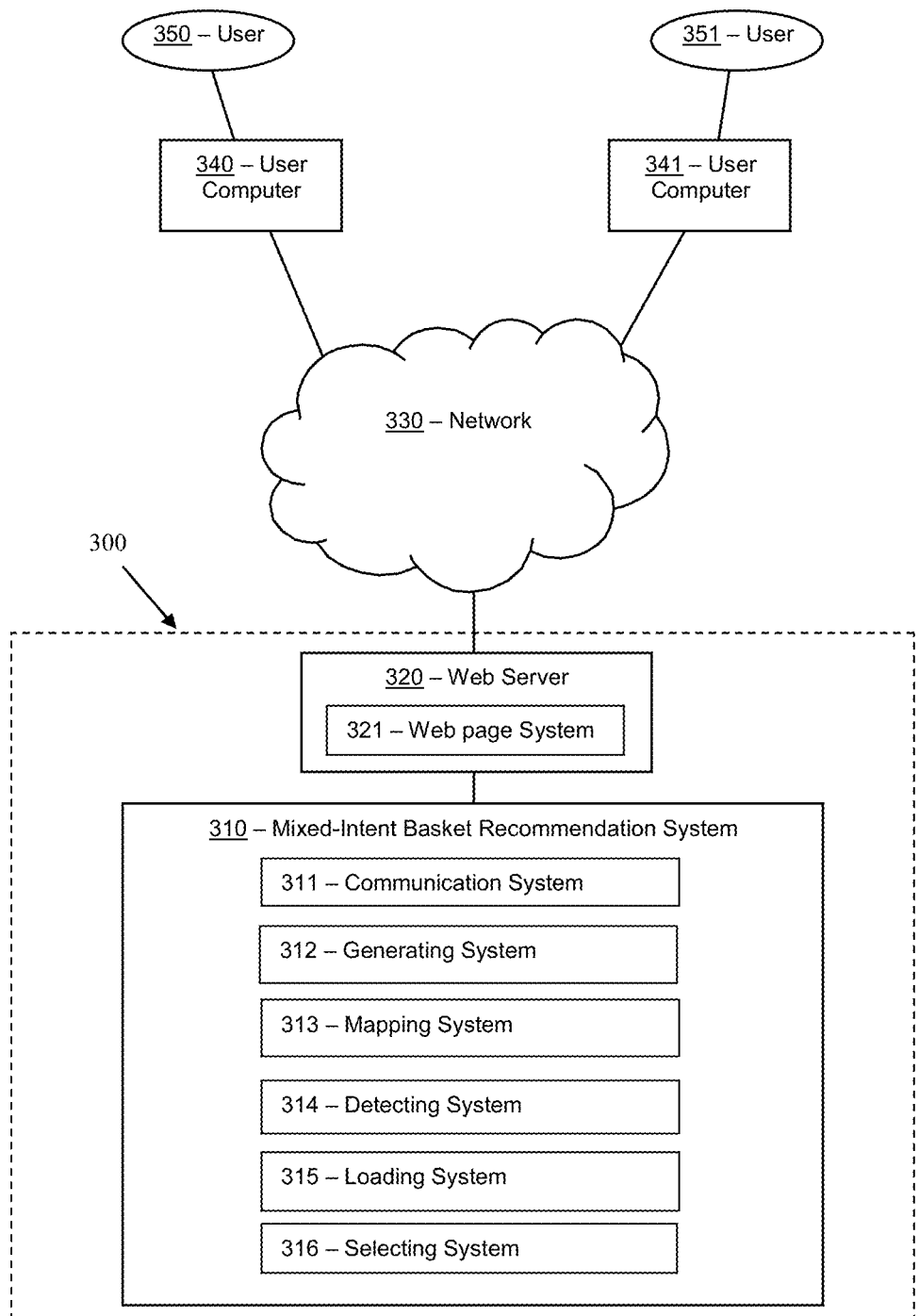
FIG. 3 illustrates a block diagram of a system that can be employed for generating one or more items that are complementary to items in a mixed-intent basket, according to an embodiment.

Turning ahead in the drawings, FIG. 3 illustrates a block diagram of a system 300 that can be employed for generating one or more items that are complementary to items in a mixed-intent basket. System 300 also can be employed for loading, using diversity rotation, a number of complementary item recommendations to a website carousel while being viewed by the user in real-time. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. System 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In many embodiments, system 300 can include a mixed-intent basket recommendation system 310 and/or a web server 320. Mixed-intent basket recommendation system 310 and/or web server 320 can each be a computer system, such as computer system 100 (FIG. 1), as described above, and can each be a single computer, a single server, or a cluster or collection of computers or servers, or a cloud of computers or servers. In another embodiment, a single computer system can host two or more of, or all of, mixed-intent basket recommendation system 310 and/or web server 320. Additional details regarding mixed-intent basket recommendation system 310 and/or web server 320 are described herein.

In a number of embodiments, each of mixed-intent basket recommendation system 310 and/or web server 320 can be a special-purpose computer programed specifically to perform specific functions not associated with a general-purpose computer, as described in greater detail below.

In some embodiments, web server 320 can be in data communication through Network 330 with one or more user computers, such as user computers 340 and/or 341. Network 330 can be a public network, a private network or a hybrid network. In some embodiments, user computers 340-341 can be used by users, such as users 350 and 351, which also can be referred to as customers, associates, and/or employees, in which case, user computers 340 and 341 can be referred to as customer computers. In many embodiments, web server 320 can host one or more sites (e.g., websites) that allow users to browse and/or search for items (e.g., products), to add items to an electronic shopping cart, and/or to order (e.g., purchase) items, in addition to other suitable activities. In several embodiments, web server 320 can include a web page system 321.

In some embodiments, an internal network that is not open to the public can be used for communications between mixed-intent basket recommendation system 310 and/or web server 320 within system 300. Accordingly, in some embodiments, mixed-intent basket recommendation system 310 (and/or the software used by such systems) can refer to a back end of system 300, which can be operated by an operator and/or administrator of system 300, and web server 320 (and/or the software used by such system) can refer to a front end of system 300, and can be accessed and/or used by one or more users, such as users 350-351, using user computers 340-341, respectively. In these or other embodiments, the operator and/or administrator of system 300 can manage system 300, the processor(s) of system 300, and/or the memory storage unit(s) of system 300 using the input device(s) and/or display device(s) of system 300.

In certain embodiments, user computers 340-341 can be desktop computers, laptop computers, a mobile device, and/or other endpoint devices used by one or more users 350 and 351, respectively. A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android™ operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can include a mobile device, and vice versa. However, a wearable user computer device does not necessarily include a mobile device, and vice versa.

In specific examples, a wearable user computer device can include a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can include (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, New York, United States of America. In other specific examples, a head mountable wearable user computer device can include the Virtual Retinal Display™ product, or similar product by the University of Washington of Seattle, Washington, United States of America. Meanwhile, in further specific examples, a limb mountable wearable user computer device can include the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

Meanwhile, in many embodiments, system 300 also can be configured to communicate with and/or include one or more databases. The one or more databases can include a product database that contains information about products, items, product type codes, complementary product types, a pre-determined list of complementary items mapped to a product type code, or SKUs (stock keeping units), for example, among other data as described herein, such as described herein in further detail. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

In many embodiments, mixed-intent basket recommendation system 310 can include a communication system 311, a generating system 312, a mapping system 313, a detecting system 314, a loading system 315, and/or a selecting system 316. In many embodiments, the systems of mixed-intent basket recommendation system 310 can be modules of computing instructions (e.g., software modules) stored at non-transitory computer readable media that operate on one or more processors. In other embodiments, the systems of mixed-intent basket recommendation system 310 can be implemented in hardware. Mixed-intent basket recommendation system 310 can be a computer system, such as computer system 100 (FIG. 1), as described above, and can be a single computer, a single server, or a cluster or collection of computers or servers, or a cloud of computers or servers. In another embodiment, a single computer system can host mixed-intent basket recommendation system 310. Additional details regarding mixed-intent basket recommendation system 310 and the components thereof are described herein.

Figure 4:
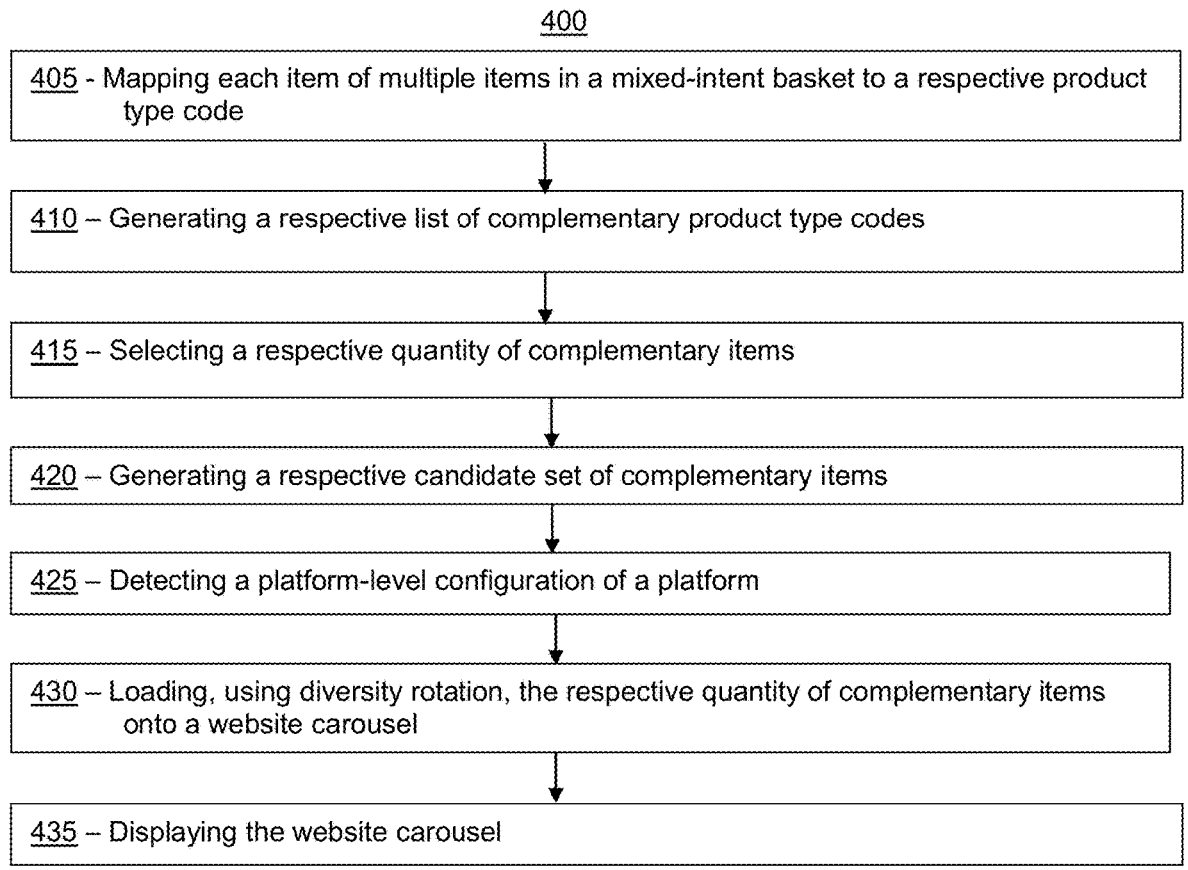
FIG. 4 illustrates a flow chart for a method, according to another embodiment.

Turning ahead in the drawings, FIG. 4 illustrates a flow chart for a method 400, according to another embodiment. In some embodiments, method 400 can be a method of automatically generating item recommendations for a mixed-intent item basket in real-time while a user is viewing a website carousel. As an example, the mixed-intent item basket can include one or more first items for which a cross-sell and/or up-sell opportunity is appropriate or desirable, and one or more second items for which a cross-sell and/or up-sell opportunity is not appropriate or desirable. Method 400 is merely exemplary and is not limited to the embodiments presented herein. Method 400 can be employed in many different embodiments and/or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped. In several embodiments, system 300 (FIG. 3) can be suitable to perform method 400 and/or one or more of the activities of method 400.

In these or other embodiments, one or more of the activities of method 400 can be implemented as one or more computing instructions configured to run at one or more processors and configured to be stored at one or more non-transitory computer-readable media. Such non-transitory computer-readable media can be part of a computer system such as mixed-intent basket recommendation system 310 and/or web server 320. The processor(s) can be similar or identical to the processor(s) described above with respect to computer system 100 (FIG. 1).

Referring to FIG. 4, method 400 can include a block 405 of mapping each item of multiple items in a mixed-intent item basket to a respective product type code (PT code). In several embodiments, the respective PT code can represent one or more other items that are complementary to each item mapped to the respective PT code. In many embodiments, a PT code can include a unique code associated with a product type (PT) and/or a product category. For example, each item added to an order or a basket (e.g., a cart or an online shopping cart) of a user can be associated to one or more product types. In following this example, each product type can include multiple items that can be complementary to another item, a variant of an item or a product, a similar product that are all within the same product type. As another example, Yogurt can be a product type and items that map or match the PT can include multiple flavors of yogurt. In following this example, items in a PT can be assigned different item identifications as many items are either variants, similar items, and/or complementary items to an anchor item in the PT. Block 405 can be similar or identical to the activities described below in connection with complementary item algorithm 1, an example of which is defined below.

In several embodiments, method 400 also can include a block 410 of generating a respective list of complementary product type codes from each respective PT code. In some embodiments, in various embodiments, ranked product types in the respective list of complementary product types can be ranked in a hierarchical order. For example, top complementary product types for yogurt can be cheeses, chips, packaged salads, granola, berries, frozen mixed fruits, and/or jellies. In many embodiments, an advantage of ranking products based on complementary product types can be to facilitate discovery of highly related complementary items for users (e.g., customers) based on items the users already added to their carts and can be seen in yields increasing an average order value metric for each user. As a further example, the hierarchical order can be based on the score for complementary PTs using a first equation. Block 410 can be similar or identical to the activities described below in connection with complementary item algorithm 1.

In various embodiments, for each PT code, block 410 also can include suppressing an item from the respective list of complementary product types that is (i) not a variant of an item in the mixed-intent basket, (ii) previously identified as added to the mixed-intent basket, or (iii) previously viewed by the user without adding the item to a previous order for purchase. In several embodiments, an advantage of suppressing an item can be shown in an example, if a television is identified as previously added to a customer basket (e.g., online cart), it can be less likely that this customer buys another television soon thereafter this television purchase, therefore the television product type can be suppressed from the list of complementary product types to increase efficiency and to target other complementary product types instead for the customer.

In some embodiments, for each PT code, block 410 additionally can include retaining an item from the respective list of complementary product types that is a variant of one or more of the multiple items in the mixed-intent basket within a same PT code.

In several embodiments, block 410 further can include calculating, using a complementary product type algorithm, a respective first score for the respective complementary product types of the respective list of complementary product types within each PT code.

In various embodiments, block 410 also can include inputting a number of PT codes representing the multiple items in the mixed-intent basket. In several embodiments, a number of complementary PTs per each PT can be used as an input to the ranking algorithm and can be configurable. For Example, for a Yogurt PT, if a number of complementary PTs is set to be three, then the complementary PTs can include cheeses, chips, and packaged salads, based on a ranking.

In a number of embodiments, based on the number of PT codes, as inputted, block 410 further can include assigning a rank for each PT code and determining a weight corresponding to a quantity of the multiple items in the mixed-intent basket. In some embodiments, the weight for each PT code can be calculated as a function of a number of unique complementary PTs, number of PTs in basket, the rank of each PT code in the complementary PT codes list, and/or a weight corresponding to the number of items in basket (e.g., online cart or order). As an example, for a mixed basket including three Yogurts and one T-shirt, the complementary PT lists can be as follows:

$PT_A \rightarrow [PT_2, PT_3, PT_4]$ (Cheeses; Chips; Packaged Salads)
$PT_B \rightarrow [PT_1, PT_6, PT_7]$ (Athletic Pants; Leggings; Joggers)

And the ranked PT list in ascending order will be:
$[PT_2, PT_3, PT_4, PT_1, PT_6, PT_7]$
where $PT_A$ can refer to PT for Yogurt and $PT_B$ can refer to PT for a T-shirt and where the ranked PT list shows the combined list of complementary PTs.

In various embodiments, block 410 additionally can include ranking, in an ascending order, each complementary product type based on its respective first score.

In several embodiments, based on the ascending order, block 410 also can include selecting as an output a number of complementary items from each PT code of the mixed-intent basket. In some embodiments, the number of complementary items from each PT of customer basket is configurable. For example, if a customer added three yogurts in the basket, the complementary product type algorithm can output two yogurts or one yogurt to find complementary items for the three yogurts added to the customer basket. Thus, an advantage to selecting an output number can be shown in this example as this dynamic selection yields different recommendations per each refresh in selecting the output number as items can be randomly sampled within each PT.

In some embodiments, block 410 further can include selecting a second set of complementary items from each PT code.

In various embodiments, block 410 also can include generating the respective ordered set of respective complementary items from the second set of complementary items based on a respective score that ranks each respective complementary item in the second set of complementary items. In several embodiments, after selecting an "n" number of items from each PT in the basket and finding the complementary items, block 410 can include filtering the items based on the complementary PTs output in the previous steps in order to rank them based on a number of unique complementary items, the number of PTs in the cart, and/or a number of items in a basket (cart or order) for each PT. An example of an ordered list of items for the basket for each PT can be shown as: [cheese1, . . . , cheese3, chips1, chips 2, tshirt1, . . . , tshirt3, legging1, legging2]

In a number of embodiments, method 400 also can include a block 415 of selecting a respective quantity of complementary items from the respective list of complementary product types, as ranked. Block 415 can be similar or identical to the activities described below in connection with complementary item algorithm 1.

In various embodiments, method 400 additionally can include a block 420 of generating, using a complementary item algorithm 1, a respective candidate set of complementary items based on the respective quantity of complementary items, as selected. Block 420 can be similar or identical to the activities described below in connection with complementary item algorithm 1.

In several embodiments, block 420 also can include calculating, using the complementary item algorithm, a second score for items in a respective list of complementary items within the respective list of complementary product types.

In some embodiments, block 420 additionally can include inputting a number of complementary items and a number of product types representing the multiple items in the mixed-intent basket. In many embodiments, a number of complementary items per each PT and a number of complementary PTs can be used as an input to a second ranking algorithm and can be configurable. In the previous example in block 410 described above, three cheese items can be selected from cheeses PT while two chips can be selected from chips PT.

In many embodiments, block 420 further can include ranking each complementary item based on a rank of the product type based on a first score.

In a number of embodiments, block 420 also can include generating an output of the complementary items, as ranked. In several embodiments, after ranking items, items can be grouped by PTs, and if a PT does not match (e.g., exist) in an ordered complementary product type, that PT can be removed. In following this example previously discussed, if there are no complementary items from these product types (Cheeses; Chips, Packaged Salads, Athletic Pants; Leggings, Joggers), each product can be removed. In some embodiments, ranking the complementary items can be based on ranked PT scores and based on sorting the complementary items in an ascending order and the second score. In various embodiments, grouping each of the complementary items by respective PTs while at the item-recommendations level for use in performing step 2 (e.g., algorithm 1) using a set or list of ranked PTs. In several embodiments, if any PT code is not within the scored complementary PT, remove the complementary items belonging to this PT. For example, for $C_1$ (e.g., customer 1) yogurt includes 2 flavors of yogurt, such as, lemon and grape, as complementary items. In this example, remove the flavors lemon and grape as the flavors since they do not belong to a complementary PT to Yogurt. In some embodiments, rank the complementary items based on ranked PT scores based on (i) sorting the complementary items in an ascending order and (ii) the second score. Similarly, generating output of the complementary items can be similar or identical to algorithm 1, as shown below.

In several embodiments, a complementary item algorithm can be expressed as complementary item algorithm 1, as follows:

For example, take items currently in an order or basket (e.g., cart) of a customer (e.g., user) where each basket includes a mix of items that can include groceries, general merchandise, and/or re-purchasable items. In this example, C can refer to a customer and each item in the basket can be described an item added to the basket by the customer by using such a format of "$C_1 \ldots n$," as follows: [$C_1$, $C_2$, $C_3$, $C_4$, $C_5$, $C_6$, $C_7$, $C_8$].

1. Group or map items from the mixed-intent basket by a Product Type (PT). For example, customer items $C_1$ to $C_8$ can be mapped to multiple PTs:
    $PT_A \rightarrow [C_2, C_3]$
    Example: Yogurt→[$C_2$, $C_3$ (2 flavors)]
    $PT_B \rightarrow [C_1, C_6, C_7]$
    Example: T-Shirt→[$C_1$, $C_6$, $C_7$ (3 colors)]
    $PT_C \rightarrow [C_4, C_5]$
    Example: Headphones→[C4 (wired), C5 (wireless)]
    $PT_D \rightarrow [C_8]$
    Example: Television→[$C_8$]
    Where $PT_A$ can refer to a Product Type A (e.g., Yogurt), $PT_B$ can refer to a product type B (e.g., T-Shirt), $PT_C$ can refer to a Product Type C (e.g., headphones), and $PT_D$ can refer to a product type D (e.g., Television).
2. Get or retrieve a list of Complementary Product Types

| Product Type: | | Complementary Items: |
| --- | --- | --- |
| Television | -> | TV Mounts, Sound Bars, Television Stands, Coffee Tables |
| Headphones | -> | Keyboard, Mouse, Webcam, Cleaning cloth |
| T-shirt | -> | Athletic Pants; Leggings, Joggers, Sweaters |
| Yogurt | -> | Cheeses; Chips; Packaged Salads |

3. From each list of Complementary Product Types, pick a "p" number of Complementary PTs, where "p" also can be configurable, such as, managing or modifying parameters without changing codes or logic.
    In this example: p=3, where $PT_1$ to $PT_7$, are complementary PTs to the mixed-intent items in the basket.
    $PT_A \rightarrow [PT_2, PT_3, PT_4]$ (Cheeses; Chips; Packaged Salads)
    $PT_B \rightarrow [PT_1, PT_6, PT_7]$ (Athletic Pants; Leggings, Joggers)
    $PT_C \rightarrow [PT_4, PT_5, PT_6]$ (Keyboard, Mouse, Webcam)
    $PT_D \rightarrow [PT_7, PT_8, PT_9]$ (TV Mounts, Sound Bars, Television Stands)
    Where $PT_1$-$PT_7$ can include complementary PTs to each $PT_A$, $PT_B$, $PT_C$, and $PT_D$, as described above.
    For example:
    $PT_A$: Yogurt
    $C_2$, $C_3$: (2 flavors)
    $PT_2$, $PT_3$, $PT_4$: (Cheeses; Chips; Packaged Salads) that are complementary items to $C_2$ and $C_3$
4. Determine if a complementary PT is either (i) present in a basket or cart, (ii) already added to the basket (e.g., an active or open order), or (iii) displayed in other website carousels without data of historical interaction from the user.

If true, then, retain the complementary PT when it includes an up-sell PT. In some embodiments, an up-sell PT can include variants and/or similar products within the PT. For example, Yogurt—multiple favors or different item identifications.

If false, suppress (e.g., remove) the complementary PT when it includes a cross-sell PT. In several embodiments, a cross-sell PT can include items where users do not purchase variants or similar products within the same PT. For example, a Television set-1 item identification. In other words, someone who is buying or who recently bought a television would not likely buy another one, so there would not likely be a cross-sell for another television if a customer has a television in his basket. If false, suppress recently viewed items where the user did not interact or select the item from a previous item recommendation.

For example, Yogurt can be an up-sell PT, and a Television set can be a cross-sell PT. In this example, generally, after a user purchases a Television set, most users seldom select another television set in the same basket or cart purchase. However, users can often purchase other flavors of yogurt during the same basket purchase. In this example, based on $PT_1$-$PT_9$, remove the cross-sell PTs already present in basket (cart) or active (open) orders, where a user viewed the cross-sell PT without interacting with it.

In another example, a complementary PT can include a Television, if a $PT_c$ referred to a TV table (not headphones), then a Television can be included as part of a Complementary item recommendation. However, if $PT_D$ Television, is present in the basket, the Complementary item recommendation would not recommend a Television, again.

5. Calculate a score for complementary PTs using a first equation, expressed as follows:

$$PT_k = \sum_{i=0}^{n} \beta_i \lambda^{r_{ki}}$$

where,
a. k is a number of unique complementary PTs
b. n is a number of PTs in basket (e.g., cart or order)
c. $r_{ki}$ is the rank of $PT_k$ in $PT_i$ (In the above example, Joggers is at rank 3 for T-shirts)
d. $\beta_i$ is the weight corresponding to a number of items in basket (cart or order) for $PT_i$ (In the above example, weight of T-shirt is function (3), whereas weight for Television is function (1)).
e. $\lambda$ is the value less than 1 (Set to 0.9 currently based on an offline evaluation).

6. Sort the Complementary PTs on the basis of the score ($PT_2$, $PT_3$ . . . . $PT_7$) in an ascending order (e.g., a higher score ranked first).

7. Pick "m" items from each PT from the basket (cart or order), m can be configurable. For example, whether a customer selects (e.g., picks) 2 T-shirt items from 3 in the basket or 1 T-shirt from 3 in the basket, m can be configurable. In such an example, configurability can cause different recommendations for each PT providing dynamically different recommendations with every refresh as these items can be randomly sampled within each PT.

8. Get Complementary items for these items and from each list of pick complementary product "cp" recommendations to determine a candidate set of items.

For example: For a television, a list of Complementary items can include approximately 200 recommendations, selecting the top 100 recommendations. In this example, the top 100 recommendations are an item level as opposed to a PT level, where the recommendations include (i) Complementary item recommendations for an anchor item and (ii) Complementary item recommendations for items that are similar to the anchor item.

$C_1$ $_{(Yogurt,\ item-1)}$→[$I_1$, $I_3$, $I_4$, . . . $I_{100}$], wherein each "I" refers to an item. Note: Up to 100 items (e.g., a configurable number). For the above example: Lays Chips, Tortilla Chips, Spinach Salad, Lemon, Grape, . . . up to 100 items, $I_{100}$)

$C_2$ $_{(T\text{-}shirt,\ item-2)}$→[$I_5$, $I_6$, $I_7$]

$C_4$→[$I_4$, $I_5$, $I_6$]

9. Filter items in the candidate set of items that can include (i) items previously added or present in the basket (e.g., cart), or (ii) items in active orders, or (iii) items on prior pages where impressed and not interacted with by the customer.

10. Calculate a second (e.g., new) score for these items by using a second equation expressed as follows:

$$I_k = \sum_{i=0}^{n} \beta_i \lambda^{r_{ki}}$$

where,
a. k is the number of unique complementary items (100 in this example if filters don't apply and less than 100 if filters applied in 9)
b. n is the number of PTs in cart (4 in this example)
c. $r_{ki}$ is the rank of $I_k$ ($Item_k$) in $C_i$ (In this example: a rank of 2 can be assigned to tortilla chips as a complementary recommendation for an item in cart belonging to a product type of Yogurt.)
d. $\beta_i$ is the weight corresponding to a number of items in a basket (cart or order) for $PT_i$ (a number of items belonging to Yogurt is 2 in the basket, thus a PT function (2)).
e. $\lambda$ is the value less than 1 (set to 0.9 based on offline evaluation).

11. Group each of the complementary items by respective PTs while at the item-recommendations level to perform step 2 using a set or list of ranked PTs. If any PT code is not within the scored complementary PT (see step 6 above), remove the complementary items belonging to this PT. For example, $C_1$ Yogurt includes 2 flavors of Yogurt, Lemon and Grape, as complementary items. See, step 8 above. In this example, remove the flavors Lemon and Grape as the flavors do not belong to a complementary PT to Yogurt.

12. Next, rank the complementary items based on ranked PT scores based on (i) sorting the complementary items in an ascending order and (ii) the second score. See steps 6 and 10, above.

13. Load a website carousel or a website using diversity rotation. Diversity rotation can be expressed as follows: Pickup q items per round per PT until carousel limit fulfilled. For example, when q is set to 2, even if there are 3 candidates from same PT, the recommendation would display only 2 items of the 3. Such a parameter can be configurable at a PT level.

For example: For laptop screens, customers generally can intend to purchase only one laptop screen. Further, for coffee tables, customers can browse 2-3 options displayed as a final set of recommendations in a website, a website carousel, and/or another suitable electronic display medium.

In several embodiments, method 400 additionally can include a block 425 of detecting a platform-level configuration of a platform used by an electronic device of a user.

In various embodiments, block 425 can include detecting a display screen size can include digitally recognizing a particular platform such as a device code of an electronic device. In some embodiments, an electronic device of the user can be detected or tracked by using a User-Agent header which is a string sent by the user's web browser to the server with an HTTP request.

In various embodiments, upon recognizing a device code, in some embodiments, switching to a suitable platform-level configuration (e.g., p, mp, cp, q) to lower values for mobile electronic devices (e.g., Android/IOS applications), and higher values for another type of electronic device (e.g., desktop, surface books, laptops. In some embodiments, after detecting the device type, the configurable ranking parameters such p and q can be used to adapt the number of recommendations to a display size, for example, 2 recommendations can be displayed per each page for mobile users and 6 recommendations can be displayed per each page for desktop/laptop users.

In some embodiments, block 425 also can include modifying an "n" quantity of complementary recommendations based on a display screen size, a type of user interface, and/or another suitable type of electronic display matching a respective device code for viewing a website carousel a respective display size matching a respective electronic device. In several embodiments, besides a user device, the screen size can also be used for platform configuration. In many embodiments, upon screen size detection, the platform-level configuration service can be triggered to determine an "n" number of complementary recommendations based on the display size or user platform (e.g., mobile (ios, android), web (e.g., laptop, desktop).

In several embodiments, a size and/or type of user interface and/or display screen of an electronic device viewed by users can include displaying a different (i) quantity of complementary item recommendations given a screen size and (ii) affect the diversity of recommendations that can fit on a respective screen size. In various embodiments, adapting the complementary items for each size and/or type of user interface can include modifying a carousel as a respective device code is detected. In several embodiments, sizing a website carousel to fit a platform can include using one or more electronic devices to view the same carousel on a website. In a number of embodiments, a user can initially build a basket or cart using an electronic device while browsing a website for each item in a mixed-intent basket and later decide to modify the basket or to purchase the times at checkout using a mobile electronic device application, at which point the complementary items recommendations also change as per the platform-level configuration. In some embodiments, when users use different device types while completing or adding to their baskets, the number of complementary recommendations displayed automatically changes according to the display size using a platform configuration system. As an example, if a user already added to a cart 3 yogurts and a T-shirt on her laptop, the recommendation carousel might display 6 items (cheese1, cheese2, cheese3, chips1, chips2, legging1), however when the same user switches to using a mobile phone and/or mobile device to check-out the purchases in the cart, the user can see just 2 recommendations in the carousel (cheese1, cheese2) and not the 6 recommendations.

In some embodiments, block 425 also can include identifying the platform based on a respective device code of the electronic device. In several embodiments, a platform can include a platform-level configuration. For example, a mobile electronic device platform (e.g., mobile phone, Android, or IOS applications) versus a website platform of an electronic device (e.g., a computer screen, laptop screen). In various embodiments, a platform configuration system can also select the number of displaying recommended items based on a device platform. For example, the device platform can be detected from User-Agent header in the HTTP request sent from users to servers.

In several embodiments, upon identifying the platform, block 425 additionally can include selecting a quantity of candidate items that can be viewed on a respective size of a display configuration of the electronic device based on the platform.

In various embodiments, block 425 also can include automatically adjusting the quantity of the candidate items based on the respective size of the display configuration of the electronic device based on the platform. In several embodiments, the platform configuration system uses any and/or all of (device type, screen size, platform type) information detected from users HTTP request to select the number of displaying recommendations.

Figure 6:
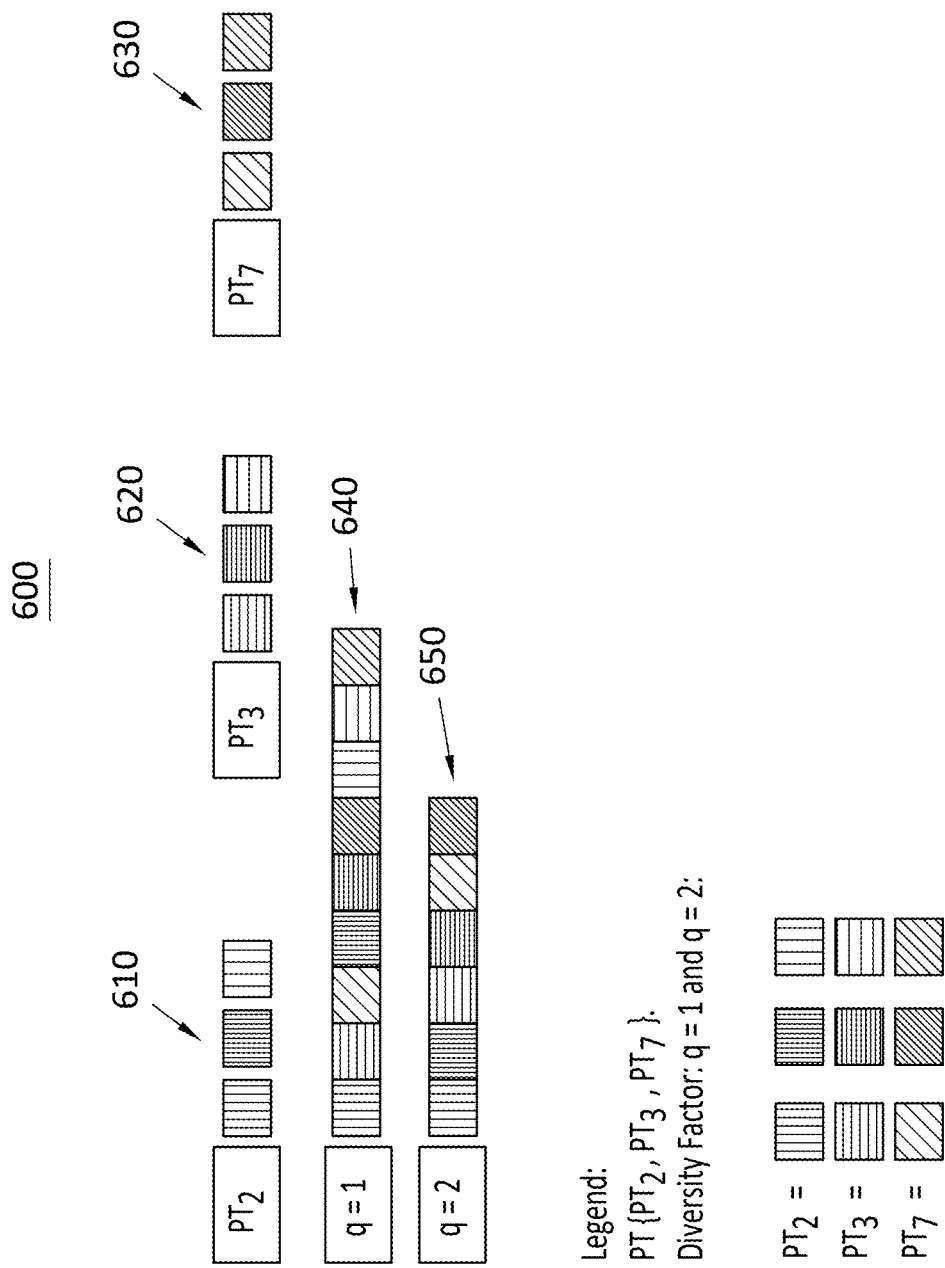
FIG. 6 illustrates an exemplary diversity rotation system, according to an embodiment.

Turning to the drawings, FIG. 6 illustrates an exemplary diversity rotation system 600 showing a configurable coverage of a website carousel to be displayed on an electronic device of a user, according to an embodiment. In some embodiments, diversity rotation system 600 is merely exemplary and embodiments of a website carousel can be employed in many different embodiments or examples not specifically depicted or described herein. In various embodiments, diversity rotation system 600 can include a $PT_2$ (610), a $PT_3$ (620), a $PT_7$ (630), a diversity factor-1 (640), and a diversity factor-2 (650).

In some embodiments, diversity rotation system 600 can determine a sequential order or pattern for each item or items of a respective PT, such as 610, 620, and/or 630, to be loaded onto a website carousel. In various embodiments, a first position on a website carousel can be an advantageous position as a user is most likely to browse the first complementary item recommendation selection before viewing the remaining recommendations on the website carousel.

In several embodiments, diversity rotation system 600 can be based on a diversity factor "q" to determine a quantity of items selected from each PT to be displayed on a user interface of an electronic device in real-time. For example, when the complementary item recommendations follow a diversity factor of 1, then 1 item from each PT can be sequentially loaded in the website carousel illustrated in diversity factor-1 (640). In following this example, when a diversity factor is 2, two items from each PT can be sequentially loaded in the website carousel illustrated in diversity factor-2 (650).

Figure 10:
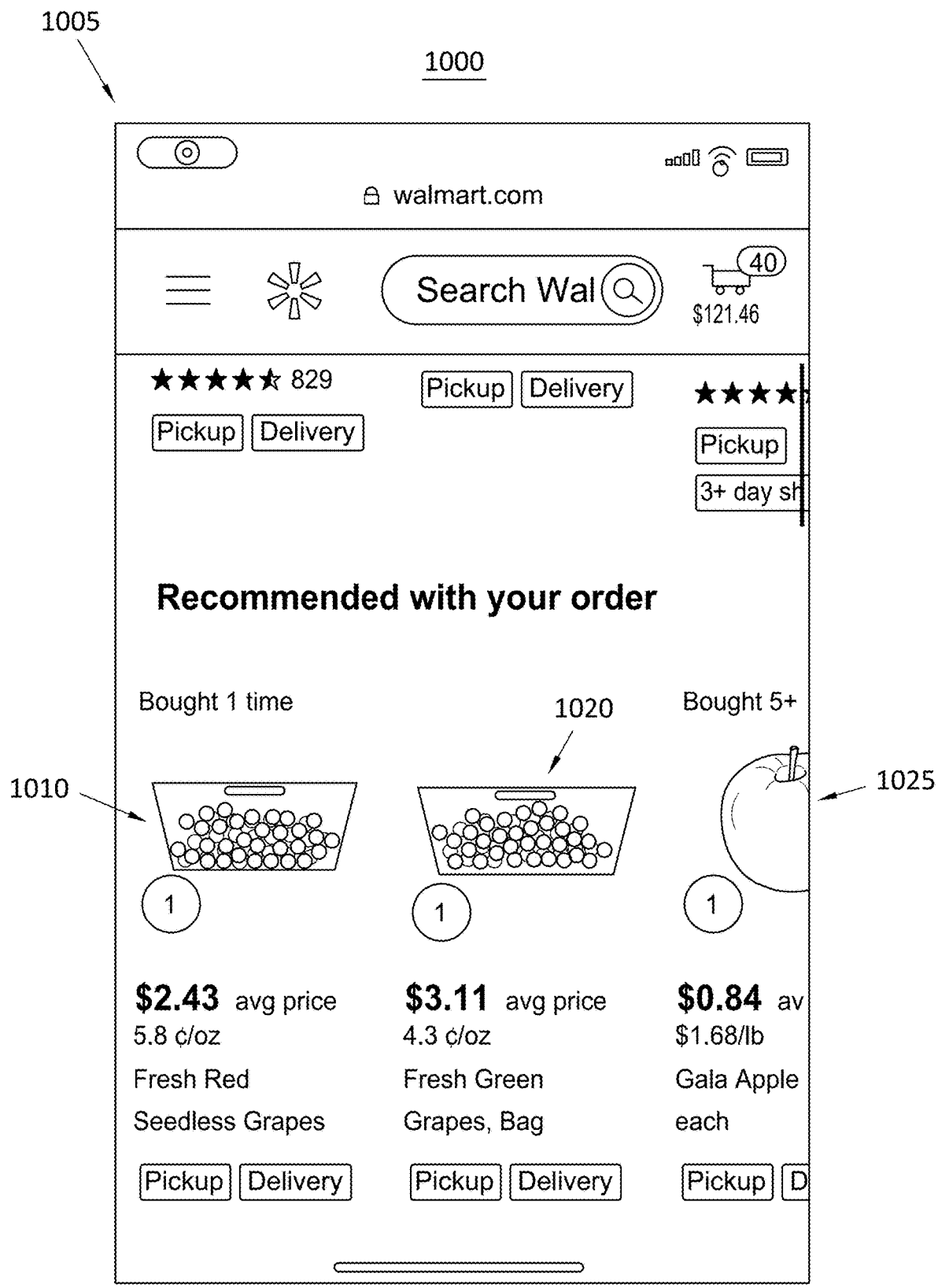
FIG. 10 illustrates an exemplary user interface for a mobile electronic device, according to an embodiment.

In following this example, items with a diversity factor of 2 can be illustrated as a bag of apples or individual apples, as shown below in connection with FIG. 7, or as red grapes or green grapes, as shown below in connection with FIG. 10, where both apples and grapes can be recommended from a same PT to provide diversified options to users.

Figure 7:
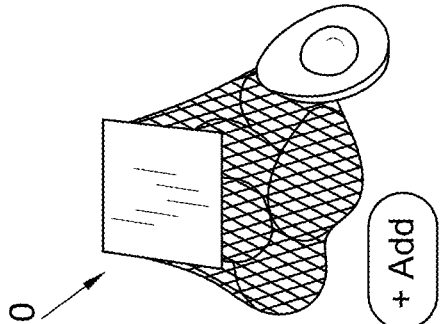
FIG. 7 illustrates an exemplary display screen of complementary item recommendations. according to an embodiment.

Turning to the drawings, FIG. 7 illustrates an example of complementary item recommendations 700 for a PT based on a diversity factor of 2. Complementary item recommendations 700 can include an item 710, an item 720, and an item 730 for a PT of an item (e.g., an anchor item) added to a mixed-intent basket or cart. Complementary item recommendations 700 are merely exemplary and embodiments of a complementary item recommendation for a PT to be loaded on a website carousel that can be employed in many different embodiments or examples not specifically depicted or described herein. In this example, both item 710 and item 720 refer to a grocery item of different apples that are complementary items in a same PT. For example, item 710 refers to a bag of apples for a certain price and item 720 refers to individual apples purchased in bulk for a price based on a bulk purchase. Additionally, item 730 refers to another complementary item for the same PT of a bag of avocados. Each of the items, 710, 720, and 730, are complementary items in the same PT and are displayed with options for a pick-up (e.g., an in-store pick-up) or a delivery (e.g., ship-to-location). In this example, item 710 and item 720 are variants of apples, such as Gala Apples or Fuji Apples, to provide options for users to select.

Turning back to the drawings, FIG. 4, in some embodiments, based on the platform-level configuration of the electronic device of the user, as detected, method 400 additionally can include a block 430 of loading, using diversity rotation, the respective quantity of complementary items onto a website carousel from each respective complementary product type taken from a respective ordered set of respective complementary items. Block 430 can be similar or identical to the activities described above in connection with FIGS. 6 & 7 and complementary item algorithm 1.

In several embodiments, based on a screen display size of the platform-level configuration, block 430 also can include selecting a number of candidate items to load for each PT code per rotation of the website carousel.

In various embodiments, using an iterative process, block 430 further can include loading the number of candidate items onto the website carousel in an ordered sequence until the website carousel reaches a limit. Block 430 can be similar or identical to the activities described below in connection with FIGS. 8-10.

Figure 8:
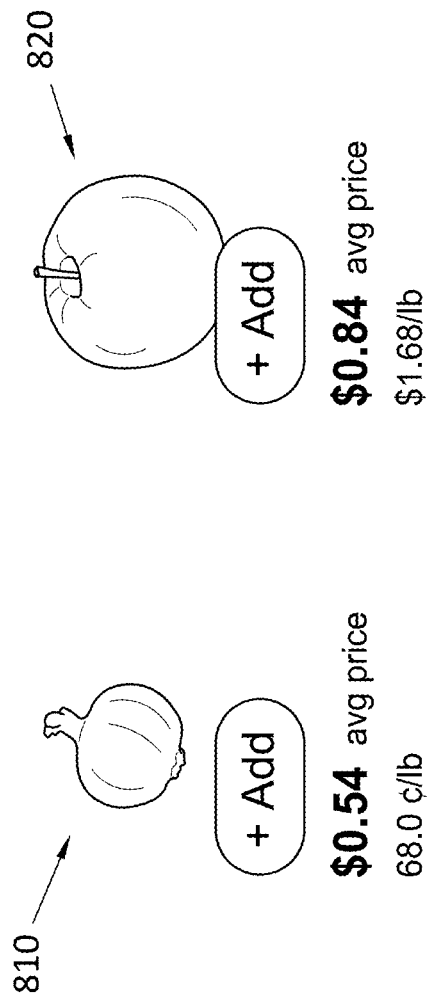
FIG. 8 illustrates an exemplary display screen of a website carousel sized to fit a display screen of a mobile electronic device, according to an embodiment.

Turning to the drawings, FIG. 8 illustrates an exemplary display screen 800 of a website carousel sized to fit a display screen of a mobile electronic device, such as an Android or IOS application. Display screen 800 is merely exemplary and embodiments of a website carousel sized to fit a display screen of a mobile electronic device can be employed in many different embodiments or examples not specifically depicted or described herein. Display screen 800 can include item 810 and item 820, where both items are complementary item recommendations for a same PT or two or more PTs for items in a mixed-intent basket.

Figure 9:
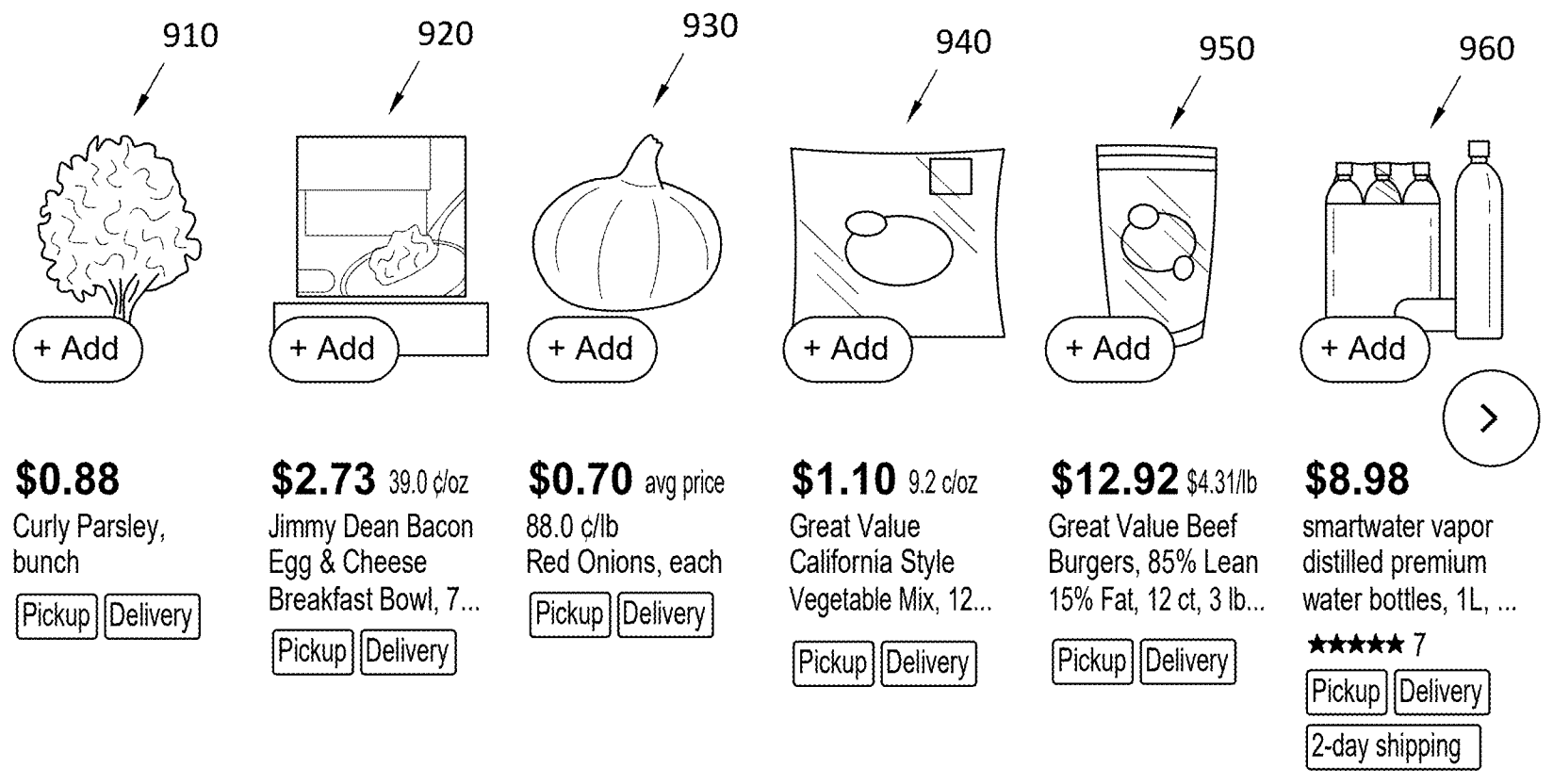

Turning to the drawings, FIG. 9 illustrates an exemplary display screen 900 of a website carousel sized to fit a display screen of a website as viewed on a full computer screen of an electronic device, such as a desktop computer or a laptop. Display screen 900 is merely exemplary and embodiments of a website carousel sized to fit a display screen of another electronic device can be employed in many different embodiments or examples not specifically depicted or described herein. Display screen 900 can include item 910, item 920, item 930, item 940, item 950, and item 960, where the items displayed are complementary item recommendations for a same PT or two or more PTs for items in a mixed-intent basket Turning to the drawings, FIG. 10 illustrates an exemplary user interface 1000 of a mobile electronic device. User interface 1000 can include a display screen 1005, an item 1010, an item 1020, and an item 1030. In various embodiments, display screen 1000 illustrates a visual display of the website carousel sized to fit a respective size of a mobile electronic device.

In various embodiments, user interface 1000 also can illustrate a set of complementary items, 1010, 1020, and 1030, for a same PT of an item (e.g., an anchor item) added to a mixed-intent basket or cart. The set of complementary items are similar to the complementary items shown in connection with FIG. 7. Complementary item recommendations, 1010, 1020, and 1030, are merely exemplary and embodiments of a complementary item recommendation for a PT to be loaded on a website carousel that can be employed in many different embodiments or examples not specifically depicted or described herein. In this example, both items 1010 and item 1020 refer to a grocery item of different varieties of grapes that are complementary items in a same PT. For example, item 1010 refers to red graphs or a certain price and items 1020 refers to green grapes for a certain price. Additionally, item 1030 refers to another complementary item for the same PT of apples. Each of the items, 710, 720, and 730, are complementary items in the same PT and are displayed with options for a pick-up (e.g., an in-store pick-up) or a delivery (e.g., ship-to-location) also to provide options for users to select.

Returning to FIG. 4, in a number of embodiments, method 400 can include a block 435 of displaying the website carousel, as loaded, on the electronic device of the user. In several embodiments, the website carousel is sized to fit the platform-level configuration. Block 430 can be similar or identical to the activities described above in connection with FIGS. 8-10 and complementary item algorithm 1.

Figure 5:
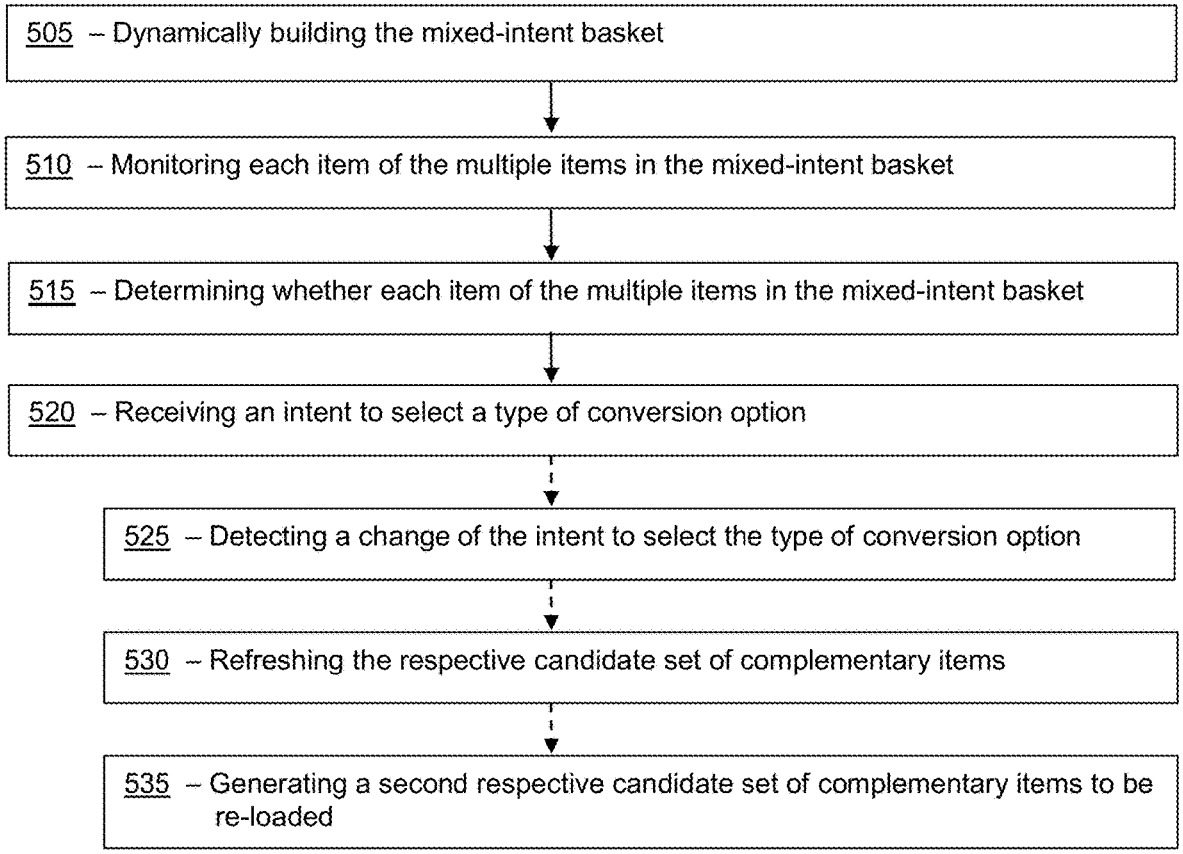
FIG. 5 illustrates a flow chart for a method of building a mixed-intent basket using multiple platforms, according to an embodiment.

Turning ahead in the drawings, FIG. 5 illustrates a flow chart for a method 500, according to another embodiment. In some embodiments, method 500 can be a method of building a mixed-intent basket using multiple platforms. Method 500 also can include detecting a change of the intent of a user to change one conversion option for another, where a new set of complementary items can be reloaded into the website carousel. Method 500 is merely exemplary and is not limited to the embodiments presented herein. Method 500 can be employed in many different embodiments and/or examples not specifically depicted or described herein. In some embodiments, the procedures, the processes, and/or the activities of method 500 can be performed in the order presented. In other embodiments, the procedures, the processes, and/or the activities of method 500 can be performed in any suitable order. In still other embodiments, one or more of the procedures, the processes, and/or the activities of method 500 can be combined or skipped. In several embodiments, system 300 (FIG. 3) can be suitable to perform method 500 and/or one or more of the activities of method 500.

In these or other embodiments, one or more of the activities of method 500 can be implemented as one or more computing instructions configured to run at one or more processors and configured to be stored at one or more non-transitory computer-readable media. Such non-transitory computer-readable media can be part of a computer system such as pick-walk system 310 and/or web server 320. The processor(s) can be similar or identical to the processor(s) described above with respect to computer system 100 (FIG. 1).

In various embodiments, method 500 can include a block 505 of dynamically building the mixed-intent basket using one or more types of platforms. In several embodiments, a mixed-intent basket can include items from two or more types of orders, such as, a grocery order, a general merchandise order, a non-re-purchasable order, a re-purchasable order, and/or another type of order.

In some embodiments, dynamically building the mixed-intent basket can include generating complementary item recommendation in real-time and/or near real-time as each item is added and/or detected in the basket. In a number of embodiments, an advantage of receiving respective real-time complementary item predictions on-the-fly as the baskets are built or filled in real-time by the users can include receiving a different or diversified set of complementary item recommendations for each timestamp of a browsing session, for each basket or cart, for each modification of an active order, for each platform-level using different electronic devices, and/or another suitable measure of diversity on a website carousel display.

In several embodiments, method 500 also can include a block 510 of monitoring each item of the multiple items in the mixed-intent basket. In some embodiments, the multiple items comprise a grocery item and a general merchandise item. As an example, a grocery item can be vegetables, fruit, meat, bread, corn starch, bottles of water, and the like, and the general merchandise item can be a t-shirt, a football, a lightbulb, and the like.

In some embodiments, method 500 further can include a block 515 of determining whether each item of the multiple items in the mixed-intent basket is (i) a pre-order confirmation recommendation or (ii) a post-order confirmation recommendation. In many embodiments, items in a mixed-intent basket can receive pre-order confirmation recommendations (e.g., complementary item recommendations) up until the order is placed. In some embodiments, an active order or open order can be saved until the user reengages with the order at a later time. In many embodiments, an open order paused to be completed at a later time can cause a new set of complementary items to load the website carousel upon re-engaging to complete the order. In several embodiments, a user also can receive post order confirmation recommendations (e.g., complementary item recommendations).

In a number of embodiments, method 500 further can include a block 520 of receiving an intent to select a type of conversion option from the electronic device of the user for an order. In some embodiments, the type of conversion option can include (i) an in-store pick-up option geared toward a first set of items fulfilled by an in-store inventory of a respective store location or (ii) a ship-to-home option (e.g., delivery) geared toward a second set of items fulfilled by a distribution center inventory (e.g., a fulfillment center inventory). In several embodiments, the distribution center inventory can be linked to a website catalog.

In a number of embodiments, selecting a type of conversion option or conversion medium can be advantageous by adding another dimension to the combinations of items and/or complementary item recommendations that are available and/or selected based on the type of conversion medium. For example, a variety of items available at a location for an in-store pick-up items can include grocery items, perishable items, an up-sell of re-purchasable items available from the store location or fulfilled at the store location. In another example, a variety of items available from a catalog or fulfillment center can include expensive items, larger sized items, non-re-purchasable items or re-purchasable items.

In several embodiments, method 500 can, optionally and/or additionally, include a block 525 of detecting, from the electronic device of the user, a change of the intent to select the type of conversion option. While building a basket or cart prior to check out or purchase, in various embodiments, a change of intent of a type of conversion option can include receiving different complementary item selections currently unavailable or not carried at a respective in-store location or a respective distribution center at the time the basket is being built. In some embodiments, modifying a conversion option during a browsing session and/or shopping session can include (i) modifying the complementary item recommendation options for each item in real-time, (ii) reloading the carousel website in real-time with another set of complementary item recommendations, (iii) changing the position on the carousel for a complementary item recommendation based on a re-ranked order; and/or another suitable modification associated with changing a conversion options in real-time.

In some embodiments, method 500 also can, optionally and/or additionally, include a block 530 of refreshing the respective candidate set of complementary items to reflect (i) the in-store inventory of the respective store location or (ii) the distribution center inventory.

In various embodiments, method 500 further can, optionally and/or additionally, include a block 535 of generating a second respective candidate set of complementary items to be re-loaded onto the website carousel, using diversity rotation, based on a second respective quantity of the complementary items from the respective list of complementary product types. In many embodiments, generating a second respective candidate set of complementary items can include a reconfigured or new set of data used to generate a second list of complementary product types using original or reconfigured data from a previous candidate set of complementary items based on an iteration of the detecting a change of the intent to select the type of conversion option received from the electronic device of the user.

Returning to the drawings, FIG. 3 illustrates a block diagram of mixed-intent basket recommendation system 310. Mixed-intent basket recommendation system 310 is merely exemplary and is not limited to the embodiments presented herein. Mixed-intent basket recommendation system 310 can be employed in many different embodiments or examples not specifically depicted or described herein. In some embodiments, certain elements or systems of mixed-intent basket recommendation system 310 can perform various procedures, processes, and/or acts. In other embodiments, the procedures, processes, and/or acts can be performed by other suitable elements or systems. In many embodiments, the systems of mixed-intent basket recommendation system 310 can be modules of computing instructions (e.g., software modules) stored at non-transitory computer readable media. In other embodiments, the systems of mixed-intent basket recommendation system 310 can be implemented in hardware.

In many embodiments, mixed-intent basket recommendation system 310 can include communication system 311. In a number of embodiments, communication system 311 can at least partially perform block 435 (FIG. 4) of displaying the website carousel, as loaded, on the electronic device of the user, and/or block 520 (FIG. 5) of receiving an intent to select a type of conversion option from the electronic device of the user for an order.

In several embodiments, mixed-intent basket recommendation system 310 also can include generating system 312. In various embodiments, mapping system 312 can at least partially perform block 410 (FIG. 4) of generating a respective list of complementary product type codes from within each PT code, or block 420 (FIG. 4) of generating, using a complementary item algorithm, a respective candidate set of complementary items based on the respective quantity of complementary items, or block 505 (FIG. 5) of dynamically building the mixed-intent-intent basket using one or more types of platforms, and/or block 535 (FIG. 5) of generating a second respective candidate set of complementary items to be re-loaded, using diversity rotation.

In some embodiments, mixed-intent basket recommendation system 310 further can include mapping system 313. In several embodiments, generating system 313 can at least partially perform block 405 (FIG. 4) of mapping each item of multiple items in a mixed-intent basket to a respective product type code.

In various embodiments, mixed-intent basket recommendation system 310 additionally can include detecting system 314. In many embodiments, prioritizing system 314 can at least partially perform block 425 (FIG. 4) of detecting a platform-level configuration of a platform used by an electronic device of a user, or 510 (FIG. 5) of monitoring each item of the multiple items in the mixed-intent basket, or block 515 (FIG. 5) of determining whether each item of the multiple items in the mixed-intent basket is (i) a pre-order confirmation recommendation or (ii) a post-order confirmation recommendation, or block 525 (FIG. 5) of detecting a change of the intent to select the type of conversion option from the electronic device of the user, and/or block 530 (FIG. 5) of refreshing the respective candidate set of complementary items to reflect (i) the in-store inventory of the respective store location or (ii) the distribution center inventory.

In several embodiments, mixed-intent basket recommendation system 310 also can include loading system 315. In some embodiments, selecting system 315 can at least partially perform block 430 (FIG. 4) of, loading, using diversity rotation, the respective quantity of complementary items onto a website carousel from each respective complementary product type taken from a respective ordered set of respective complementary items.

In a number of embodiments, mixed-intent basket recommendation system 310 additionally can include selecting system 316. In several embodiments, mixed-intent basket recommendation system 310 can at least partially perform block 415 (FIG. 4) of selecting a respective quantity of complementary items from the respective list of complementary product types.

In several embodiments, web server 320 can include a web page system 321. Web page system 321 can at least partially perform sending instructions to user computers (e.g., 350-351 (FIG. 3)) based on information received from communication system 311.

In a number of embodiments, the techniques described herein can advantageously enable real-time data processing and increase the capability to fulfill orders while decreasing the distance travelled to pick the item for the orders.

In many embodiments, the techniques described herein can be used continuously at a scale that cannot be handled using manual techniques. For example, the number of online orders processed and/or received daily can exceed over one million items (products) required to be processed in a timely manner.

Various embodiments can provide the most relevant recommendations that maximize conversion (i.e., consumer purchase) based on the type of customer journey and the set of items in the basket when considered together as input. Items in the basket (i.e., pre-order confirmation recommendations) or items in the order just placed (i.e., post-order confirmation recommendations) can be geared towards any of the following combinations: (a) grocery-only order, (b) general merchandise and non-re-purchasable items-only order, or (c) mixed general merchandise and grocery re-purchasable items such as grocery-dominant order, general merchandise-dominant order, or re-purchasable items dominant order. Other inputs can include the customer's conversion medium via the kind of items and selection made in the basket, such as store pick-up items only (e.g., baskets with grocery items only, up-sell of re-purchasable items that can be picked up from the store or fulfilled by the store) and ship-to-home items (e.g., for expensive and non-re-purchasable items, larger basket with all re-purchasable items, etc.)

Various embodiments can include a system including one or more processors and one or more non-transitory computer-readable media storing computing instructions that, when executed on the one or more processors, cause the one or more processors to perform certain acts. The acts can include mapping each item of multiple items in a mixed-intent basket to a respective product type code (PT code). The respective PT code can represents one or more other items that are complementary to each item mapped to the respective PT code. The acts also can include generating a respective list of complementary product type codes from each respective PT code. The ranked product types in the respective list of complementary product types can be ranked in a hierarchical order. The acts further can include selecting a respective quantity of complementary items from the respective list of complementary product types, as ranked. The acts additionally can include generating, using a complementary item algorithm, a respective candidate set of complementary items based on the respective quantity of complementary items, as selected. The acts also can include detecting a platform-level configuration of a platform used by an electronic device of a user. Based on the platform-level configuration of the electronic device of the user, as detected, the acts further can include loading, using diversity rotation, the respective quantity of complementary items onto a website carousel from each respective complementary product type taken from a respective ordered set of respective complementary items. The acts also can include displaying the website carousel, as loaded, on the electronic device of the user. The website carousel can be sized to fit the platform configuration.

A number of embodiments can include a method being implemented via execution of computing instructions configured to run at one or more processors and stored at one or more non-transitory computer-readable media. The method can include mapping each item of multiple items in a mixed-intent basket to a respective product type code (PT code). The respective PT code can represents one or more other items that are complementary to each item mapped to the respective PT code. The method also can include generating a respective list of complementary product type codes from each respective PT code. The ranked product types in the respective list of complementary product types can be ranked in a hierarchical order. The method further can include selecting a respective quantity of complementary items from the respective list of complementary product types, as ranked. The method additionally can include generating, using a complementary item algorithm, a respective candidate set of complementary items based on the respective quantity of complementary items, as selected. The method also can include detecting a platform-level configuration of a platform used by an electronic device of a user. Based on the platform-level configuration of the electronic device of the user, as detected, the method further can include loading, using diversity rotation, the respective quantity of complementary items onto a website carousel from each respective complementary product type taken from a respective ordered set of respective complementary items. The method also can include displaying the website carousel, as loaded, on the electronic device of the user. The website carousel can be sized to fit the platform configuration.

Although automatically generating complementary item recommendations for items in a mixed-intent basket has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-10 may be modified, and that the foregoing discussion of certain of these embodiments does not necessarily represent a complete description of all possible embodiments. For example, one or more of the procedures, processes, or activities of FIGS. 3-10 may include different procedures, processes, and/or activities and be performed by many different modules, in many different orders, and/or one or more of the procedures, processes, or activities of FIGS. 3-10 may include one or more of the procedures, processes, or activities of another different one of FIGS. 3-10. As another example, the systems within mixed-intent basket recommendation system 310 and/or webserver 320. Additional details regarding mixed-intent basket recommendation system 310 and/or webserver 320, (see FIGS. 3, 4, and 5) can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
    one or more processors; and
    one or more non-transitory computer-readable media storing computing instructions that, when executed on the one or more processors, cause the one or more processors to:
    cause, using web server functionality of the system and communications via a network, a display screen, for a website carousel, to be displayed in a user interface of an electronic device;
        map, to a respective product type (PT) code, each item of multiple items in a mixed-intent basket that is built by use of the electronic device to browse for the multiple items during a browsing session, wherein the respective PT code represents one or more other items that are complementary to each item mapped to the respective PT code;
        generate, using generating functionality of the system, a respective list of complementary product types from each respective PT code by suppressing an item from the respective list of complementary product types to increase efficiency associated with providing the website carousel for display, wherein ranked product types in the respective list of complementary product types are ranked in a hierarchical order;
        select a respective quantity of complementary items from the respective list of complementary product types, as ranked;
        generate, using a complementary item algorithm, a respective candidate set of complementary items based on the respective quantity of complementary items, as selected;
        digitally recognize, using detecting functionality of the system, a platform used by the electronic device;
        modify, based on digitally recognizing the platform used by the electronic device and based on a type of the user interface of the electronic device, a quantity of complementary recommendations to be displayed in the website carousel; and
        cause, using the web server functionality and the communications via the network and based on the quantity of complementary recommendations, a loaded version of the website carousel to be displayed in the user interface of the electronic device by loading, using diversity rotation, items onto the website carousel from each respective candidate set of complementary items.

2. The system of claim 1, wherein the computing instructions, when executed on the one or more processors, further cause the one or more processors to:
    receive, from the electronic device, information regarding an intent to select a type of conversion option,
        wherein the type of conversion option comprises (i) an in-store pick-up option geared toward a first set of items fulfilled by an in-store inventory of a respective store location or (ii) a ship-to-home option geared toward a second set of items fulfilled by a distribution center inventory, and
        wherein the distribution center inventory is linked to a website catalog.

3. The system of claim 2, wherein the computing instructions, that when executed on the one or more processors, further cause the one or more processors to:
    refresh the respective candidate set of complementary items to reflect (i) the in-store inventory of the respective store location or (ii) the distribution center inventory.

4. The system of claim 1, wherein the suppressed item is (i) not a variant of an item in the mixed-intent basket, (ii) previously identified as added to the mixed-intent basket, or (iii) previously viewed without being added to a previous order.

5. The system of claim 1, wherein to generate the respective list of complementary product types, the computing instructions cause the one or more processors to:
    calculate, using a complementary product type algorithm, first scores for the respective complementary product types of the respective list of complementary product types; and
    rank, in an ascending order, each complementary product type based on its respective first score.

6. The system of claim 1, wherein, to generate the respective candidate set of complementary items, the computing instructions cause the one or more processors to:
    calculate, using the complementary item algorithm, a score for items in a respective list of complementary items within the respective list of complementary product types.

7. The system of claim 1, wherein, to modify the quantity of complementary recommendations to be displayed in the website carousel, the computing instructions cause the one or more processors to:
    select a quantity of candidate items that can be viewed on a respective size of a display configuration of the electronic device based on the platform used by the electronic device.

8. The system of claim 7, wherein, to modify the quantity of complementary recommendations to be displayed in the website carousel, the computing instructions cause the one or more processors to:
    modify the quantity of complementary recommendations based on the respective size of the display configuration of the electronic device based on the platform.

9. The system of claim 1, wherein loading, using the diversity rotation, the quantity of complementary items comprises:
    selecting a number of candidate items to load for each PT code per rotation of the website carousel; and
    using an iterative process, loading the number of candidate items onto the website carousel in an ordered sequence until the website carousel reaches a limit.

10. A method being implemented via execution of computing instructions configured to run on one or more processors and stored at one or more non-transitory computer-readable media, the method comprising:
    causing, using communications via a network, a display screen, for a website carousel, to be displayed in a user interface of an electronic device;
    mapping, to a respective product type (PT) code, each item of multiple items in a mixed-intent basket, wherein the respective PT code represents one or more other items that are complementary to each item mapped to the respective PT code;
    generating a respective list of complementary product types from each respective PT code by suppressing an item from the respective list of complementary product types;
    digitally recognizing a platform used by the electronic device;
    identifying, based on digitally recognizing the platform used by the electronic device and based on the type of the user interface of the electronic device, a quantity of complementary recommendations; and
    causing, using the network, a loaded version of the website carousel to be displayed in the user interface of the electronic device based on the quantity of complementary recommendations and based on the respective list of complementary product types.

11. The method of claim 10, further comprising:
    receiving information regarding an intent to select a type of conversion option,
        wherein the type of conversion option comprises (i) an in-store pick-up option geared toward a first set of items fulfilled by an in-store inventory of a respective store location or (ii) a ship-to-home option geared toward a second set of items fulfilled by a distribution center inventory, and
        wherein the distribution center inventory is linked to a website catalog.

12. The method of claim 11, further comprising:
    detecting a change of the intent to select the type of conversion option.

13. The method of claim 10, wherein generating the respective list of complementary product types comprises:
    for each PT code, suppressing a respective item, from the respective list of complementary product types, that is (i) not a variant of an item in the mixed-intent basket, (ii) previously identified as added to the mixed-intent basket, or (iii) previously viewed.

14. The method of claim 10, wherein generating the respective list of complementary product types comprises:
    for each PT code, retaining an item that is a variant of one or more of the multiple items in the mixed-intent basket within a same PT code.

15. The method of claim 10, wherein generating the respective list of complementary product types comprises:
    calculating, using a complementary product type algorithm, respective first scores for respective complementary product types of the respective list of complementary product types; and
    ranking, in an ascending order, each complementary product type based on its respective first score.

16. The method of claim 10, wherein causing the loaded version of the website carousel to be displayed in the user interface of the electronic device:
    calculating, using a complementary item algorithm, a second score for items in a respective list of complementary items within the respective list of complementary product types; and
    generating the loaded version of the website carousel based on the respective score for the items in the respective list of complementary items and based on the quantity of complementary recommendations.

17. The method of claim 10, wherein digitally recognizing the platform used by the electronic device comprises:
    identifying the platform based on a respective device code of the electronic device.

18. The method of claim 10, wherein identifying the quantity of complementary recommendations comprises:
    automatically adjusting a quantity of candidate items that can be viewed based on the platform used by the electronic device.

19. One or more non-transitory, computer-readable media, comprising instructions that, when executed by one or more processors, cause the one or more processors to:
    cause, using a web server, a display screen, for a website carousel, to be displayed in a user interface of an electronic device;
    map, to a respective product type (PT) code, each item of multiple items in a mixed-intent basket that is built by use of the electronic device to browse for the multiple items during a browsing session;
    generate a respective list of complementary product types from each respective PT code;
    digitally recognize, using detecting functionality of the system, a platform used by the electronic device;
    modify, based on digitally recognizing the platform used by the electronic device and based on a type of the user interface of the electronic device, a quantity of complementary recommendations to be displayed in the website carousel; and
    cause, based on the respective list of complementary product types and based on the quantity of complementary recommendations, a loaded version of the website carousel to be displayed in the user interface of the electronic device by loading items onto the website carousel from a respective candidate set of complementary items.

20. The one or more non-transitory, computer-readable media of claim 19, wherein the display screen is a display screen of a website or a display screen of a mobile device application.

* * * * *